United States Patent [19]

Russell

[11] 4,074,085

[45] Feb. 14, 1978

[54] MULTIPLE BEAM OPTICAL RECORD PLAYBACK APPARATUS FOR SIMULTANEOUS SCAN OF PLURAL DATA TRACKS

[75] Inventor: James T. Russell, Richland, Wash.

[73] Assignee: Eli S. Jacobs, New York, N.Y.

[21] Appl. No.: 672,458

[22] Filed: Mar. 31, 1976

[51] Int. Cl.$^2$ ............................................. G11B 7/00
[52] U.S. Cl. ..................... 179/100.3 B; 179/100.3 D; 365/120
[58] Field of Search ................. 179/100.3 B, 100.3 D, 179/100.3 V, 100.3 Z; 358/128, 130; 360/77, 26, 70; 340/173 LT, 173 LM

[56] References Cited

U.S. PATENT DOCUMENTS

| | | | |
|---|---|---|---|
| 1,925,608 | 9/1933 | Round | 179/100.3 D |
| 2,842,756 | 7/1958 | Johnson | 360/26 X |
| 3,327,299 | 6/1967 | Johnson | 360/26 |
| 3,370,133 | 2/1968 | Bender | 179/100.3 B |
| 3,701,847 | 10/1972 | Miyauchi et al. | 358/130 |
| 3,795,902 | 3/1974 | Russell | 340/173 LM |
| 3,806,643 | 4/1974 | Russell | 358/130 |

Primary Examiner—John H. Wolff

Attorney, Agent, or Firm—Klarquist, Sparkman, Campbell, Leigh, Hall & Whinston

[57] ABSTRACT

An optical data record playback apparatus is described for simultaneously scanning a plurality of data tracks on the optical record by employing two or more light beams controlled by closed loop servos. First and second optical servo means respectively, are employed to deflect the light beams for tracking of such beams during scanning along the data tracks and for maintaining the proper spacing between beams to cause each beam to follow a different track. In addition, a time adjust means, which may be a third optical servo or an electronic signal delay means, is employed to adjust the time relationship of the two readout signals produced by such light beams. The optical servos may include either movable mirrors or light refraction plates. Alternatively, an electromagnetically deflected bundle of optical fibers can be employed as the first servo and a zoom lens at the output of such fibers as the second servo. Also, a double refraction polarizing device, such as a calcite crystal, can be employed as both the second and third servos by pivoting such crystal about two mutually perpendicular axes.

17 Claims, 6 Drawing Figures

MULTIPLE BEAM OPTICAL RECORD PLAYBACK APPARATUS FOR SIMULTANEOUS SCAN OF PLURAL DATA TRACKS

BACKGROUND OF THE INVENTION

The subject matter of the present invention relates generally to optical data record recording and playback apparatus in which two or more light beams are employed for playback to simultaneously scan a corresponding number of data tracks recorded on an optical record. In particular the invention relates to such a playback apparatus in which closed loop optical servo means are employed to deflect the light beams during scanning for tracking the light beams along the data tracks and for maintaining the spacing between the two light beams to that corresponding to the spacing between adjacent tracks, as well as a time adjust means for adjusting the relative time or phase of two readout signals produced by such light beams during playback.

The playback apparatus of the present invention is especially useful for playing back optical records having high density data storage of analog or digital information in the form of closely spaced adjacent data tracks. For example, such an optical record can be used to store video and audio television signals.

Previously, it has been proposed in my earlier U.S. Pat. No. 3,501,586, granted Mar. 17, 1970, to provide a single light beam playback apparatus for optical records employing a light detector and mirror servo for maintaining the light beam on the data track during scanning. Similar playback apparatus are disclosed in U.S. Pat. No. 3,854,015 of Janssen, granted Dec. 10, 1974, and U.S. Pat. No. 3,673,412 of Olson, granted June 27, 1972, both of which employ a single light beam for tracking using a servo.

It has also been proposed to simultaneously playback two data tracks on an optical record by means of two light beams without the use of servos, as shown in U.S. Pat. No. 1,925,608 of Round, issued Sept. 5, 1933. However, the data tracks are of analog audio signals which are not closely spaced together so that mechanical alignment of the light beams in such patent is sufficient for proper tracking and beam spacing. A similar teaching is shown in U.S. Pat. No. 3,370,133 of Bender, granted Feb. 2, 1968. While mechanical adjustment can be employed to insure proper tracking and spacing between the readout light beams when the data tracks are spaced relatively far apart, it is not satisfactory when the data tracks are closely spaced from one another, such as on the order of 5.0 to 0.5 micron, as in the case of high density storage requiring high scanning speeds to produce output signals having data rates on the order of 50 to 100 megabits per second. Another problem with mechanical alignment is the difficulty in maintaining the time relationship between the two output signals produced by scanning adjacent data tracks during playback so that they are synchronized to within about 2 nanoseconds or $2 \times 10^{-9}$ second. An even more serious problem results when the record is not dimensionally stable, causing track position and spacing to change due to heat expansion or wear so that the alignment problem would vary from record to record, which would make mechanical tracking of such high density storage records impossible.

The present invention overcomes the above discussed problems of the prior art by employing three independent servos. Two closed looped optical servos are provided for deflecting the light beams in response to photodetector sensed error signals to adjust the beams laterally with respect to the tracks and to adjust the spacing between such beams to maintain such beam spacing equal to the track spacing. A third closed loop optical servo or an electronic time delay is provided for adjusting the time relationship of the two light beams or their readout signals in order to synchronize the two readout signals of adjacent tracks.

It should be noted that variable electronic time delays have been employed previously to synchronize the signals of magnetic tape recorders, as shown in U.S. Pat. No. 2,842,756 of Johnson, granted July 8, 1958, and U.S. Pat. No. 3,327,299 of Johnson, granted June 20, 1967. However, neither of these patents relate to the problem of scanning two light beams along a pair of closely adjacent data tracks on an optical record, in the manner of the present invention.

The advantages of the multiple beam playback apparatus of the present invention are many, including reduced scanning speed during recording and playback, and reduced modulation rate for modulating the light beam during recording over that required for a single light beam recorder and playback apparatus. It enables closer spacing between tracks for higher density storage and maintains time relationship or synchronism between readout signals at high data rates. Finally, it automatically compensates for changes in position of the data tracks or spacing between the tracks due to dimensional instability of the recording or variations in the beam position or spacing between beams due to improper mounting and mechanical adjustment of the playback apparatus. This automatic compensation is achieved by simple and economical servos which operate in a fast and accurate manner over a long useful lifetime.

SUMMARY OF INVENTION

It is therefore one object of the present invention to provide an improved optical record playback apparatus which employs a plurality of light beams to simultaneously playback a corresponding number of data tracks on such record while automatically maintaining the proper spacing between beams and tracking such beams along the data tracks.

Another object of the invention is to provide such a playback apparatus in which the adjacent data tracks are recorded extremely close together to provide high density storage while employing a plurality of closed loop optical servos to enable fast accurate tracking and to maintain the proper spacing between beams to provide readout signals of a high data rate.

A further object of the present invention is to provide such a playback apparatus which simplifies the recording apparatus by reducing the scanning speed and light beam modulation rate necessary for a given data rate.

An additional object of the present invention is to provide such a playback apparatus which maintains the time relationship or synchronism between two readout signals produced by light beams scanning adjacent data tracks, with a high degree of accuracy.

Still another object of the present invention is to provide such a playback apparatus which is simple and economical to operate and has a long useful lifetime.

A still further object of the invention is to provide such a playback apparatus in which time adjustment or synchronism of the two readout signals is accomplished by means of an electronic time delay controlled by a feedback signal corresponding to the time difference between such two readout signals.

BRIEF DESCRIPTION OF DRAWINGS

Other objects and advantages of the present invention will be apparent from the following detailed description of certain preferred embodiments thereof and from the attached drawings, of which.

DESCRIPTION OF PREFERRED EMBODIMENTS

Figure 1:
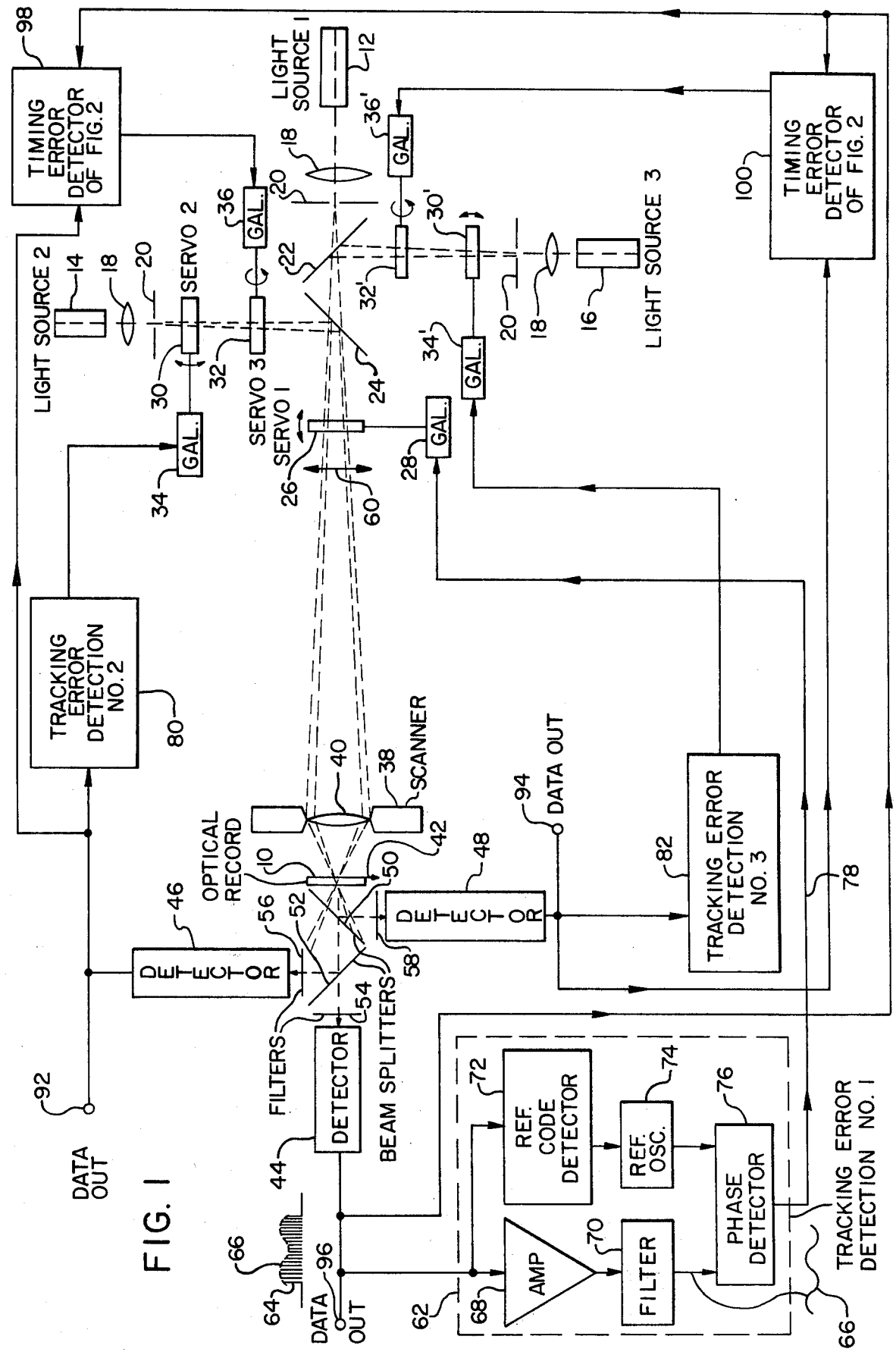
FIG. 1 is a schematic diagram of one embodiment of the playback apparatus of the present invention.

As shown in FIG. 1, one embodiment of the playback apparatus of the present invention includes an optical record 10 of analog or digital information recorded thereon in a plurality of closely spaced substantially parallel data tracks of optical data spots, such as shown in my earlier U.S. Pat. No. 3,501,586 cited above. Three light sources 12, 14, and 16, such as lasers, emit light beams of three different wavelengths, which are each transmitted through a focusing lens 18 and pinhole mask 20 to form the three light beams which simultaneously scan three different adjacent data tracks on optical record 10.

The first light beam emitted by source 12 is transmitted through a pair of beam splitting mirrors 22 and 24 to a light beam deflection means 26 forming part of a first closed loop optical servo. The deflection means 26 is shown as a light refraction plate but could also be a mirror, such deflection means being suitably mounted on a galvanometer 28 for movement thereof in response to a tracking error signal. The second and third light beams emitted by sources 14 and 16 respectively, are each transmitted through a second refraction plate or mirror 30 and 30', respectively, and a third refraction plate or mirror 32 and 32', respectively. The second refraction plate 30 is mounted on a second galvanometer 34 to form part of a second closed loop optical servo and the third refraction plate 32 is mounted on a third galvanometer 36 forming part of a third closed loop optical servo. The galvanometers 34 and 36 pivot refraction plates 30 and 32 in response to spacing error signals and timing error signals, respectively, applied to such galvanometers in a manner hereafter described.

The second light beam strikes the beam splitting mirror 24 and is reflected to the left through the first refraction plate 26. Similarly, the third light beam is reflected by the beam splitting mirror 22 through the beam splitting mirror 24 to the first refraction plate 26. Thus, all three light beams pass through the refraction plate 26 to a mechanically driven optical scanner 38.

The optical scanner 38 can be like that shown in my earlier U.S. Pat. No. 3,501,586, or it may be in the form of a rotating support having a plurality of objective lenses 40, mounted thereon, for scanning the light beams perpendicular to the plane of FIG. 1 in the drawings, along three different data tracks closely spaced adjacent to one another on the optical record 10. This scanner is shown in greater detail in my copending U.S. patent application Ser. No. 516,453, filed Oct. 21, 1974, now abandoned in favor of continuation application Ser. No. 727,369, filed Sept. 27, 1976. Scanner 38 also advances the record longitudinally in the direction of arrow 42 as the lenses 40 are scanned across such record.

The optical record 10 is assumed to be of the light transparent type, although it can be of a light reflective type if corresponding changes are made in the position of the light detectors. The three light beams are transmitted through three different tracks on such record and are modulated by moving across the optical data spots in such tracks before being received by first, second, and third light detectors 44, 46, and 48 respectively. The light detectors are photoelectric cells, each producing an electrical output signal corresponding to the modulated light beam received by such detector. A pair of beam splitting mirrors 50 and 52 are positioned in the paths of the modulated light beams after they are transmitted through record 10 so that one portion of such light beams is reflected downward from mirror 50 toward detector 48 while another portion of such light beams is reflected upward from mirror 52 toward detector 46 and still another portion of such light beams is transmitted through both beam splitting mirrors toward detector 44. In order to select a different one of the three light beams for transmission to each of the detectors, three different wavelength light filters 54, 56, and 58, respectively, are positioned in front of detectors 44, 46, and 48, such filters only transmitting one of the three different wavelength light beams. It should be noted that different polarized light could be employed rather than light of different wavelength for the light beams as hereafter discussed in connection with FIG. 5, and in this case the filters are replaced by polarizers.

The first light refraction plate 26 is employed to deflect all three light beams together laterally with respect to the data tracks during scanning to maintain such beams on such tracks, assuming the proper spacing between such beams. In this regard, it should be noted that the light beams are scanned along the data tracks in a direction perpendicular to the plane of FIG. 1 of the drawings. Thus, the light beams are all deflected up and down in the direction of arrows 60 by the first refraction plate 26 to maintain them on the tracks.

In order to determine whether the light beam is being scanned along the center of the track, it is possible to dither or oscillate the light beam back and forth across the track center line at a predetermined dither frequency to produce a playback signal whose envelope is compared in phase with the dither signal to determine whether the beam is tracking properly, as shown in my earlier U.S. Pat. No. 3,501,586. However, the present invention preferably employs dithered tracks on the optical record whose major portions are positioned alternately on opposite sides of the center line of the tracks to provide the necessary tracking information. In this latter case, a first tracking error detection circuit 62, of the type disclosed in my copending U.S. patent application Ser. No. 645,806, filed Dec. 31, 1975, is connected to the output of the first light detector 44 to produce the tracking error signal which is applied to galvanometer 28 for pivoting refraction plate 26 to deflect the light beams so that the first beam moves back toward the center line of its track to compensate for such tracking error.

As shown in FIG. 1, a digital pulse readout signal 64, produced at the output of the first detector 44, is amplitude modulated at the dither frequency of the track to provide a sine wave envelope 66 corresponding to such dither frequency when the scanning light beam is out of alignment with the center line of the track. This readout signal is transmitted into the tracking error detection circuit 62 through an amplifier 68 and a low frequency filter 70, which only passes the dither envelope 66. The digital readout signal contains a reference code which is detected by a reference code detector circuit 72, having its input connected in common to the input of amplifier 68. The output of the reference code detector 72 synchronizes a reference oscillator 74, whose sine wave output signal is applied to one input of a phase detector circuit 76, having its other input connected to the dither envelope signal 66 at the output of filter 70. The phase detector 76 compares the phase of the reference oscillator signal and the dither envelope 66 of the readout signal to determine whether the first light beam is above or below the center line of the data track, as discussed in the above mentioned copending U.S. patent application Ser. No. 645,806.

It should be noted that when the light beam is tracking along the center line of the data track, no envelope signal is produced because the readout pulses are not amplitude modulated under these conditions and the phase detector 76 produces no error signal output. However, when the light beam is above or below the center line of the data track, the envelope signal 66 is produced and the amplitude of such envelope signal corresponds to the distance the light beam is spaced from the center line of the data track. The phase detector 76 produces a D.C. voltage error signal corresponding to the amplitude of the envelope signal 66 and having a positive or negative polarity, depending on the relative phase of such envelope signal with respect to the reference oscillator signal, which indicates whether the light beam is above or below the track center line. This tracking error signal is transmitted through conductor 78 to the galvanometer 28, which pivots refraction plate 26 a corresponding amount to deflect the light beam back towards the center line of the data track. Thus, a first closed looped optical servo is formed by the refraction plate 26, light detector 44, tracking error detector circuit 62, and galvanometer 28.

The color filters 54, 56 and 58 can be eliminated if the mirrors 50 and 52 are dichroic mirrors which are combined color filters and mirrors and are more efficient in the transmission and reflection of light than beam splitting mirrors. Thus, mirror 50 would then transmit the frequencies of the first and second light beams and would reflect the frequency of the third beam, while mirror 52 would transmit the frequency of the first beam and reflect the frequency of the second beam.

The second and third light detectors 46 and 48 are also respectively connected to tracking error detection circuits 80 and 82, similar to tracking error detection circuit 62, to produce spacing error output signals. The outputs from such tracking error detection circuits 80 and 82 are each fed to one of the galvanometers 34 and 34' respectively, to adjust the spacing between the light beams. The spacing error signals applied to galvanometers 34 and 34' cause them to pivot the refraction plates 30 and 30' to deflect the second and third light beams and adjust their spacing relative to the first light beam to conform to the spacing between their respective data tracks. This is automatically done by the pair of second closed loop optical servos, including servo 30, 46, 80, and 34 and servo 30', 48, 82, and 34'.

For example, if the spacing between the two adjacent data tracks being scanned by light beams 1 and 2 increases, light beam 1 could begin tracking above the center line of its data track to produce a positive first tracking error signal of, for example +1 volt, at the output of detector 62, while light beam 2 could begin tracking below the center line of its track and produce a negative second tracking error signal of, for example −1 volt at the output of detection circuit 80. The first tracking error signal would cause the first optical servo, including galvanometer 28 and refraction plate 26, to move the first light beam down into alignment with the center line of its data track and reduce the first tracking error signal to zero. However, this will cause the second light beam to be moved further below the center line of its data track to increase the value of the second tracking error signal to −2 volts at the output of the detection circuit, giving the same resultant spacing error signal of −2 volts. The spacing error signal at the output of circuit 80 is applied to the galvanometer 34 to tip the refraction plate 30, causing the second light beam to move up to the center line of its data track in the above example and further away from the first light beam, until they are spaced apart by a greater distance corresponding to the spacing between the data tracks.

A similar operation takes place with the tracking error detector 82 whose output signal controls galvanometer 34', which pivots refraction plate 30', to change the spacing of the third light beam relative to the first beam.

Figure 6:
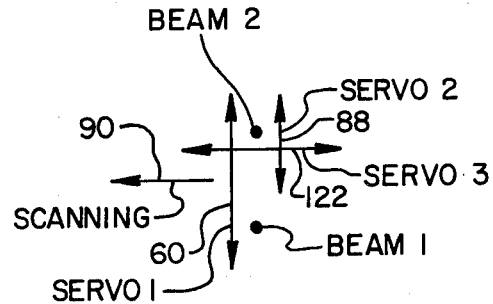
FIG. 6 is a diagramatic view showing the tracking deflection of the light beams by the three optical servos in the present playback apparatus.

The operation of the first and second optical servos in deflecting light beams 1 and 2 for proper tracking during playback is shown in FIG. 6. Thus, the first servo controlled refraction plate 26 deflects both light beams up and down in the direction of arrows 60. However, the second servo controlled refraction plate 30 deflects only light beam 2 up and down in the direction of arrows 88 with respect to light beam 1. This assumes that the light beams are being scanned in the direction of arrow 90 in FIG. 6, which is of course perpendicular to the plane of the drawing in FIG. 1.

The readout signals of light detectors 46 and 48 are transmitted to data output terminals 92 and 94 respectively, and such readout signals may be out of synchronism with the output signal transmitted from the first light detector 44 to its output terminal 96. This can be corrected by a time adjustment means, which, in the embodiment of FIG. 1, is a pair of third closed loop optical servos. The third servos include refraction plates 32 and 32' and associated galvanometers 36 and 36', which are connected to the outputs of timing error detectors 98 and 100 respectively. The timing error detectors 98 and 100 each have one input connected to the outputs of light detectors 46 and 48 respectively, and have their other input connected in common to the output of detector 44.

Figure 2:
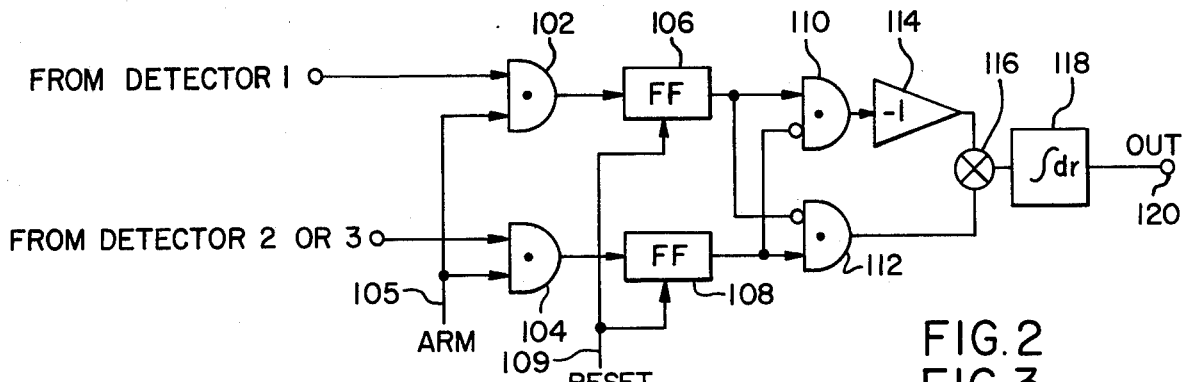
FIG. 2 is a block diagram of an electrical circuit which may be employed as a timing error detector in the circuit of FIG. 1.

Each of the timing error detectors 98 and 100 has an electrical circuit, such as that shown in FIG. 2, which includes two AND gates 102 and 104, gate 102 having one input connected to the output of light detector 44 and gate 104 having one input connected to the output of light detectors 46 or 48. The other inputs of gates 102 and 104 are connected to an arming signal source 105. The outputs of the AND gates 102 and 104 are each connected to a different one of a pair of bistable multivibrators or flip-flops 106 and 108 to trigger such flip-flops. The flip-flops are both also connected to a reset signal source 109 for resetting them to their original stable state from their triggered state. The outputs of the flip-flops 106 and 108 are each connected to one input of a pair of inhibited AND gates 110 and 112 which have their inhibit input terminals designated by open dots, connected to the output of the opposite flip-flop. Thus, the output signal of flip-flop 106 is conducted through AND gate 110 as long as such AND gate is not inhibited by receipt of the output signal of flip-flop 108. Conversely, the output signal of flip-flop 108 is transmitted through AND gate 112 as long as such AND gate is not inhibited by the output of flip-flop 106. The output of AND gate 110 is transmitted through an inverting amplifier 114 to one input of an adder 116, whose other input is connected to the output of AND gate 112. The two inputs of the adder 116 are algebraically added together to produce a sum output signal which is transmitted through an integrating circuit 118 to produce a timing error output signal at output terminal 120. The timing error output is applied to the galvanometer 36 or 36' in FIG. 1, to tip the refraction plate 32 or 32' a corresponding amount to bring the light beams and their respective output signals into synchronism. This causes the second and third light beams to be deflected relative to the first light beam in the direction of arrows 122 in FIG. 6 substantially parallel to the scanning direction 90. As a result, the first and second light beams are positioned so that during scanning they strike the corresponding portions of adjacent data tracks at the same time and produce readout signals which are synchronized with respect to one another.

Figure 3:
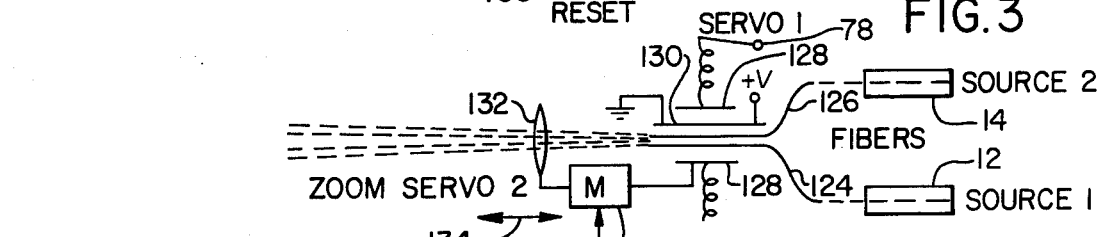
FIG. 3 is a schematic diagram of a portion of another embodiment of the playback apparatus of the present invention.

As shown in FIG. 3, another embodiment of the playback apparatus of the present invention employs a different type of light deflection means for the first servo and the second servo in place of the refraction plates 26 and 30 and associated galvanometers 28 and 34, of FIG. 1. In FIG. 3, light sources 12 and 14 each project light into the input end of a different one of a pair of optical fibers 124 and 126, respectively, whose output ends are deflected up and down by electromagnetic deflection means 128 on opposite sides of such fibers connected to the output 78 of tracking error detector 62 to provide the first servo. One suitable optical fiber deflection means is disclosed in my U.S. Pat. No. 3,941,927, granted Mar. 2, 1976, which employs an electrical current conductor 130, coated on the outside of the optical fibers at the output ends thereof. One end of the conductor 130 is connected to a positive D.C. voltage source while its other end is grounded in order to cause electrical current to flow through such conductor and produce an electromagnetic field surrounding the conductor. This enables the conductor and the optical fibers attached thereto to be deflected by the electromagnetic field produced by the deflection means 128. Of course, the deflection of the output ends of the optical fibers by deflection means 128 causes the light beams 1 and 2 to move up and down in the direction of arrow 60 in FIG. 6, for tracking purposes.

The second optical servo in FIG. 3 includes a "zoom" lens 132 positioned adjacent the output ends of the optical fibers 124 and 126 for changing the magnification of the light beams emitted from such output ends. The zoom lens is adjusted toward and away from the optical fibers in the direction of arrows 134 by means of a D.C. controlled electrical motor 136, having its input 138 connected to the output of spacing error detector 84. The motor 136 is also connected to a support for the output ends of the optical fibers and their associated deflection means 128, to move them relative to the optical record 10, in the direction of arrows 140. As a result of the adjustment of the zoom lens in the direction of arrows 134 and 140, the magnification is changed in order to vary the spacing between the two light beams in the direction of arrows 88 of FIG. 6, while maintaining such light beams focused on the optical record.

Figure 4:
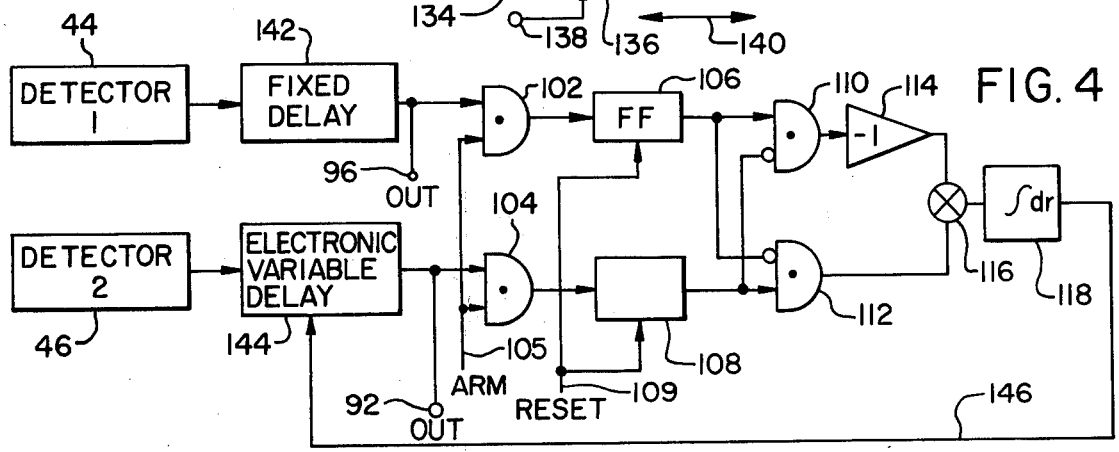
FIG. 4 is a block diagram of an electrical circuit which can be employed with the apparatus of FIG. 3 in place of a third optical servo, as a timing adjustment means for varying the time relationship between two readout signals produced by detectors sensing the light beams.

In order to provide synchronism between the two playback signals produced by the first and second light beams of the playback apparatus of FIG. 3, the time adjust means is provided by a variable electronic delay for such signals, as shown in FIG. 4. This electronic delay circuit is used in place of the third optical servo including tipping plate 32 and associated galvanometer 36 and the timing error detector 98 or 100 of FIG. 1, to provide timing adjustment of the readout signals. As shown in FIG. 4, this timing adjustment circuit is very similar to that of FIG. 2 so that only the differences between these two circuits will be described. A fixed electronic time delay 142 is connected between the output of detector 44 and the common connection of output terminal 96 and the input of AND gate 102, and a variable electronic time delay 144 is connected between the output of detector 46 and the common connection of output terminal 92 and the input of AND gate 104. The output of the integrator circuit 118 is connected through a negative feedback conductor 146 to the control terminal of the variable delay circuit 144 in order to delay the readout signal produced by the second light detector 46 by an adjustable amount corresponding to the time difference between the first and second delayed readout signals at outputs 96 and 92. As a result, the second readout signal reaches output terminal 92 at the same time the first readout signal produced by light detector 44 reaches output terminal 96.

The time adjustment means of FIG. 4 adjusts the relative time of the application of the first and second readout signals to output terminals 92 and 96 rather than deflecting light beam 2 relative to light beam 1 in the direction of arrows 122, as shown in FIG. 6, as is done by the third optical servo of the apparatus of FIG. 1. It should be noted that the timing error signal produced at the output of the integrator 118 is a D.C. voltage whose amplitude corresponds to the difference in time between the two delayed readout signals produced at the output of delay means 142 and 144. The transmission of such timing error voltage through the negative feedback connection 146 to the variable delay 144 reduces this time difference to zero, thereby synchronizing the delayed readout signals. The time adjustment circuit of FIG. 4 is for use with analog readout signals and timing errors are detected by comparing the start of the data tracks or definable segments of such tracks, such as the horizontal blanking pulses of a plurality of television line signals recorded in each track. If digital readout signals are to be compared, the electronic variable time delay is replaced by an up down digital counter, memory, and associated digital correction circuitry shown in my copending U.S. patent application Ser. No. 556,780, filed Mar. 10, 1975.

Figure 5:
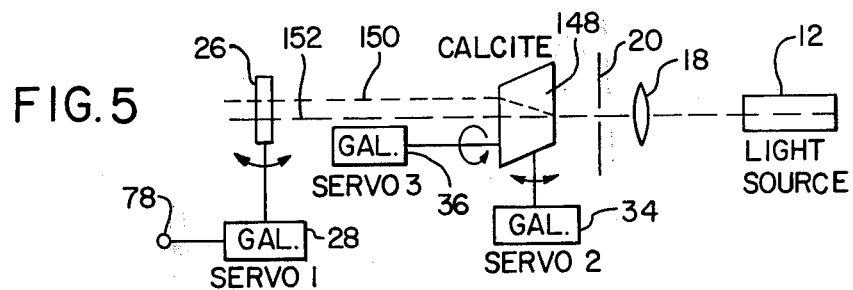
FIG. 5 is a schematic diagram of a portion of a third embodiment of the playback apparatus of the present invention.

A third embodiment of the playback apparatus of the present invention is shown in FIG. 5 and is similar to FIG. 1 but includes a double refraction polarizing element 148, such as a calcite crystal, which splits an input light beam produced by the light source 12 into two output light beams 150 and 152. Light beam 152 is in alignment with the input light beam and provides the first light beam received by light detector 44, while the second light beam 150 is received by light detector 46 to control the first, second, and third servos in the same manner as FIG. 1. Both light beams 150 and 152 are deflected for tracking purposes by the refraction plate 26 and the corresponding galvanometer 28 forming the first optical servo, shown more completely in FIG. 1. The second and third optical servos, including galvanometers 34 and 36 respectively, both use the same double refraction polarizer element 148 to adjust the spacing between the two light beams 150 and 152 in the direction of arrows 88 and to adjust the time relationship of such light beams in the direction of arrows 122, as shown in the diagram of FIG. 6. Thus, the second servo galvanometer 34 pivots the polarizer 148 about an axis extending perpendicular to the drawing of FIG. 5, through a small angle of approximately plus or minus 15° or less to vary the beam spacing. It should be noted that the primary spacing between the two light beams 150 and 152 is determined by the length of the calcite crystal 148 in a direction parallel to the light beam.

The third servo galvanometer 36 pivots the polarizer 148 about an axis parallel to the light beam 152 and thereby causes the second light beam 150 to pivot in an arc about the first light beam 152. This causes a time adjustment of the second light beam 150 relative to the first light beam 152 in an arcuate direction similar to arrows 122 in FIG. 6, to adjust the time relationship of the two readout signals produced by such beams. Since the two light beams 150 and 152 are oppositely polarized when they emerge from the double refraction polarizer crystal 148 and the filters 54 and 56 in front of the light detectors 44 and 46 are replaced by corresponding oppositely polarized polarizer elements, this enables detector 44 to only receive the first light beam 152 while the detector 46 only receives the second light beam 150. It should be noted that in this embodiment only two polarized light beams are produced so that the third detector 48 and its associated detection circuits 82, 86 and 100 as well as servo elements 30', 34', and 32', 36' are not employed.

It will be obvious from the above that many changes may be made in the details of the preferred embodiments of the present invention without departing from the spirit of the invention. Therefore, the scope of the present invention should only be determined by the following claims.

I claim:

1. A multiple beam optical record playback apparatus comprising:

an optical record having at least two optical data tracks recorded thereon each including a plurality of optical data spots;

beam forming means for producing at least two light beams;

scanning means for scanning each of said two light beams along a different one of said two data tracks to modulate said light beams by moving them across the optical data spots thereon;

first detector means for detecting the modulated first light beam and producing a corresponding first electrical output signal;

second detector means for detecting the modulated second light beam and producing a corresponding second electrical output signal;

first optical servo means connected to the output of the first detector, for deflecting both of said two light beams laterally to said two data tracks; and second optical servo means connected to the output of the second detector for adjusting the lateral spacing between said two light beams.

2. Playback apparatus in accordance with claim 1 in which the first servo means includes a first tracking error detection circuit which determines when the first light beam becomes misaligned with the axis of the data track it is scanning and produces a tracking error signal having an amplitude proportional to the distance of said first beam from alignment with said axis, and having a polarity indicating whether the first beam is above or below said axis.

3. Playback apparatus in accordance with claim 2 in which the second servo means includes a second tracking error detection circuit substantially the same as said first detection circuit.

4. Playback apparatus in accordance with claim 1 which also includes time adjust means for adjusting the relative time of transmission of said first and second output signals to data output terminals.

5. Playback apparatus in accordance with claim 4 in which the time adjust means includes an adjustable electronic delay means connected to the output of one detector.

6. Playback apparatus in accordance with claim 5 which also includes a fixed electronic delay means connected to the output of the other detector, and a time coincidence means having two inputs connected to different outputs of said adjustable delay means and said fixed delay means, for producing a negative feedback signal which is applied to the control terminal of said adjustable delay means to cause synchronization of the two output signals of said fixed and variable delay means, said feedback signal corresponding in magnitude to the time difference between said two output signals which are applied to said data output terminals.

7. Playback apparatus in accordance with claim 6 in which the coincidence means includes first and second AND gates each having one input connected to a different delay means and another input connected to an arming signal source, first and second bistable multivibrators each connected to be triggered by the output of a different one of said AND gates and to be reset by a common reset signal source, third and fourth inhibited AND gates each having a normal input connected to one of the multivibrators and an inhibit input connected to the other of said multivibrators, a phase inverter circuit connected to the output of said third gate, an adder circuit having one input connected to said inverter circuit, and another input connected to the fourth gate, and an integrator circuit connected to the output of said adder to produce said negative feedback signal at the output of said integrator which is connected to the control terminal of said adjustable delay means.

8. Playback apparatus in accordance with claim 4 in which said time adjust means includes a third optical servo means connected to the outputs of both of said first and second detector means, for adjusting the longitudinal distance between said first and second light beams to change the relative time that said first and second light beams scan longitudinally along said two data tracks.

9. Playback apparatus in accordance with claim 8 in which the third servo means includes a light refraction plate which is pivoted in response to the output signals of said first and second detectors.

10. Playback apparatus in accordance with claim 8 in which the second and third servo means are provided by the same double refraction polarizing member which splits one light beam into two light beams of different polarity and is pivoted about two perpendicular axes to adjust the spacing and time relationship of said beams.

11. Playback apparatus in accordance with claim 10 in which the polarizing member is a calcite crystal.

12. Playback apparatus in accordance with claim 1 in which said first optical servo includes an optical deflection means which moves in response to said first output signal of said first detector.

13. Playback apparatus in accordance with claim 12 in which the deflection means is a light refraction plate.

14. Playback apparatus in accordance with claim 13 in which the second optical servo includes another light refraction plate in the path of one of said two beams.

15. Playback apparatus in accordance with claim 12 in which the deflection means is a mirror.

16. Playback apparatus in accordance with claim 12 in which the deflection means includes a plurality of optical fibers each having a different light beam transmitted therethrough.

17. Playback apparatus in accordance with claim 16 in which the second optical servo includes a lens at the output ends of said fibers and adjustable magnification means for adjusting the position of said lens relative to said output ends and for adjusting the position of said output ends relative to said record.

* * * * *